United States Patent [19]

Kruppa et al.

[11] 4,063,911
[45] Dec. 20, 1977

[54] HIGH TEMPERATURE POLAR STATIONARY LIQUID PHASE FOR GAS CHROMATOGRAPHY

[75] Inventors: Richard F. Kruppa, State College, Pa.; Arthur Edward Coleman, Troy, N.Y.

[73] Assignees: Applied Science Laboratories, Inc., State College, Pa.; Silar Laboratories, Inc., Watervliet, N.Y.

[21] Appl. No.: 574,868

[22] Filed: Jan. 14, 1976

Related U.S. Application Data

[63] Continuation-in-part of Ser. No. 379,988, July 17, 1973, abandoned.

[51] Int. Cl.$^2$ .............................................. B01D 15/08
[52] U.S. Cl. ..................................... 55/67; 55/386
[58] Field of Search ............... 55/67, 386; 210/31 C, 210/198 C; 260/46.5 D, 47 CB, 248.2 R, 248.2 B, 248.2 N; 252/428, 449

[56] References Cited
U.S. PATENT DOCUMENTS

| | | | |
|---|---|---|---|
| 3,168,544 | 2/1965 | Jex ................................. | 260/448.2 N |
| 3,185,663 | 5/1965 | Prober ........................... | 260/448.2 N |
| 3,185,719 | 5/1965 | Prober ........................... | 260/448.2 N |
| 3,448,076 | 6/1969 | Bluestein ....................... | 260/448.2 N |
| 3,808,125 | 4/1974 | Good ............................. | 55/386 X |

*Primary Examiner*—John Adee
*Attorney, Agent, or Firm*—Thomas E. Sterling

[57] ABSTRACT

This invention is an improved stationary phase utilized in gas-liquid chromatography, having high thermal stability, producing low noise level in an electrical detecting apparatus, comprising of a silicone polymer with recurring units of the formula:

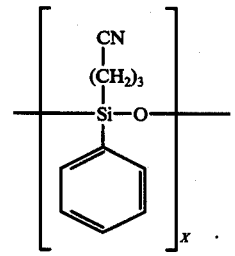

4 Claims, 3 Drawing Figures

HIGH TEMPERATURE POLAR STATIONARY LIQUID PHASE FOR GAS CHROMATOGRAPHY

This is a continuation-in-part of Application Ser. No. 379,988 filed July 17, 1973 now abandoned.

This invention relates to a stationary phase in gas-liquid chromatography and in particular to a new substance for use as a stationary phase.

Many materials have been used as the stationary phase in gas-liquid partition chromatography columns for the separation of methyl esters of fatty acids, monoglycerides and other compounds requiring a polar stationary phase, but all of these are either limited in thermal stability to about 200° C., or are characterized by too low a degree of polarity, to be satisfactory. Thus, a low polarity of the stationary phase limits, to a considerable extent, the degree of separation between components in a mixture being analyzed. Inadequate thermal stability results in decomposition and/or vaporization of the stationary phase and a short period of usefulness for the chromatography column. Even during this short period of use, the decomposition products of the stationary phase result in a relatively great noise level in the electronic detecting apparatus used so that recorder tracings are distorted and interpretation is difficult or impossible. A stationary phase to be useful in this type of system must be stable and of low volatility under the relatively high operating temperature of the column, and must be selective in its retention of certain components of the mixture being analyzed. The stationary phase must also be capable of uniform distribution upon its finely divided solid support. It is with respect to an improved stationary phase that this invention relates.

It is an important object of this invention to provide a thermally stable and low volatility column packing, useful at temperatures up to 275° C., and consisting of a stationary phase coated on an inert support, for use in separation and analysis of complex mixtures (for example methyl esters of fatty acids and monoglycerides).

It is a further object of the invention to provide a gas-liquid partition column packed with a thermally stable and non-volatile stationary phase supported on an inert material.

It is also an object of the invention to provide a stationary phase which is sufficiently polar to cause separation of methyl stearate, methyl oleate, methyl linoleate, methyl linolenate, and other high boiling compounds such as monostearin, monoolein, and monolinolein as their trimethylsilyl either or n-butylboronate derivatives.

It is also an objective to produce a stationary phase which is sufficiently high boiling and non-volatile so as not to be eluted from the column. An additional object of the invention is to provide such a stationary phase having properties such that samples dissolved therein can be eluted from it easily to obtain sharp elution peaks with good symmetry.

Figure 1:
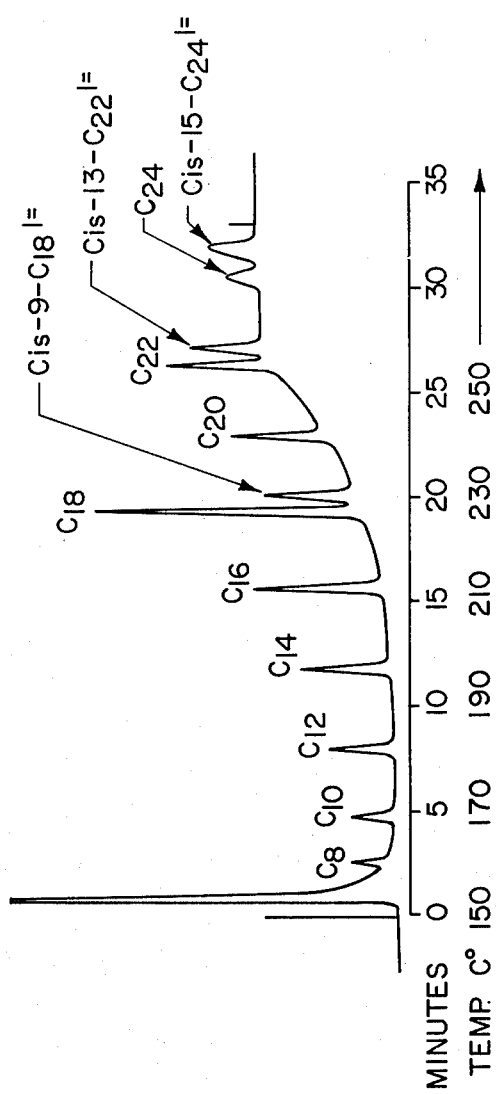
FIG. 1 is a gas chromatogram, referred to in EXAMPLE VI, of
Fatty Acid Methyl Esters
Temperature Programmed at 4° C/min.
on
10% Cyanopropyl Phenyl Silicone
(50% cyanopropyl, 50% phenyl) on
100/120 GAS-CHROM Q in 6' × 4mm I.D. glass column.
Flame ionization detector at 1 × 10⁻⁹ AFS
N₂ flow rate = 40ml/min.

According to our invention, for a stationary phase we employ a silicon polymer composed of recurring units as follows:

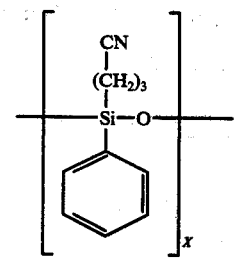

Where X is a whole number greater than 2.

PREPARATION (γ-Cyanopropyl) phenyldichlorosilane was prepared by adding 67.1 grams (1.0 moles) of allylcyanide slowly to 177.1 grams (1.0 moles) of phenyldichlorosilane containing 10⁻⁴ moles of platinum as chloroplatinic acid at a temperature of 130° – 135° C. in a three-necked flask. After completion of the addition, the reaction mixture was heated at 120° C. for 16 hours. The pure (γ-cyanopropyl) phenyldichlorosilane was isolated by fractional distillation (b.p. 132° C./0.7 mm).

A polymeric material was prepared from (γ-cyanopropyl) phenyldichlorosilane by adding a solution of 122.1 grams (0.5 moles) of the chlorosilane in 50 grams of toluene to a slurry of 90.3 grams (1.05 moles) of sodium bicarbonate in 175 grams of toluene. The mixture was then refluxed for four hours to remove water of condensation. The toluene solution was then washed three times with distilled water to remove salts. The toluene solution was filtered through anhydrous sodium sulfate and heated under vacuum with a nitrogen purge to 150° C. for one hour to remove toluene and residual water. A clear viscous polymeric material resulted.

About 0.001 parts of hexamethyldisiloxane is then added, along with 30 parts per million 86% H₂SO₄ equilibration catalyst and the reaction mixture is heated to 120° and maintained for 8 hours at this temperature. The resulting polymer of composition

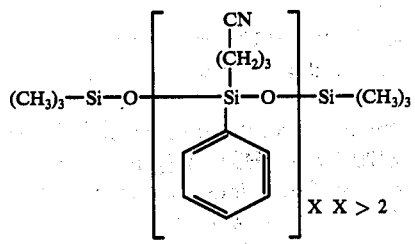

is dissolved in toluene and the catalyst washed out with 5% NaHCO₃ followed by water. The solution is dried, filtered and solvent stripped.

EXAMPLE I

A column packing consisting of 3% of the cyanopropyl phenyl silicone polymer deposited on 100/120 mesh GAS-CHROM Q solid support was prepared and packed into a 6 foot long, 4mm I.D. column. Operating conditions were: column temperature 180° C., inlet pressure 14 psig, flow rate 34 ml per minute. The following typical analytical results were obtained with a mixture containing the compounds listed:

| Sample | Retention Time | Retention Time Relative To Methyl Stearate |
|---|---|---|
| Methyl Stearate | 6.0 | 1.00 |
| Methyl Oleate | 6.8 | 1.13 |
| Methyl Linoleate | 8.2 | 1.36 |
| Methyl Linolenate | 10.1 | 1.69 |
| Methyl Arachidate | 11.6 | 1.93 |

EXAMPLE II

The same column was operated under the same conditions except the column temperature was 240° C. Monoglycerides were analyzed as their n-butylboronate derivatives and trimethylsilyl either derivatives. The results are listed in the table below:

| Sample | Boronate Derivatives | T.M.S. Derivatives |
|---|---|---|
| Monostearin | 1.00 | 1.00 |
| Monoolein | 1.12 | 1.11 |
| Monolinolein | 1.31 | 1.30 |

Similar results were obtained repeatedly with this and other columns made in a similar manner. There was a very low noise level on the electronic recording system and components present in small proportions could be readily detected and estimated. These data make it apparent that the silicone polymer described can be used effectively at temperatures up to 275° C. for chromatographic analysis.

From the above, it is apparent that we have obtained the objects of our invention and have provided a stationary phase for a gas chromatographic column packing which is thermally stable to temparatures up to 275° C., and which has a degree of polarity sufficient to separate saturated and unsaturated methyl esters of fatty acids and saturated and unsaturated monoglycerides and other compounds of a similar nature. The invention has been described with reference to preferred embodiments, but it is to be understood that these are by way of illustration only. Accordingly, it is contemplated that modifications and variations can be made in the preparation of the polymer without departing from the basic idea of the invention.

Modifications can also be made in the proportion in the phase on the support and the material of the support and in the conditions of the use and the substance analyzed.

EXAMPLE III

The McReynolds Constants were determined for the cyanopropyl phenyl silicone by the method of McReynolds [1]. The following table lists the McReynolds Constants for nine widely used gas chromatographic liquid stationary phases and the cyanopropyl phenyl silicone in increasing order of polarity as defined by McReynolds [1].

|  | Upper Temp. Limit, ° C | McReynolds Constants | | | | | |
|---|---|---|---|---|---|---|---|
|  |  | 1 | 2 | 3 | 4 | 5 | 5/1 |
| 100% Methyl Silicone, OV-101[1] | 350 | 17 | 57 | 45 | 66 | 43 | 227 |
| 50% Phenyl 50% Methyl Silicone, OV-17[1] | 350 | 119 | 158 | 162 | 243 | 202 | 884 |
| 50% Trifluoropropyl 50% Methyl Silicone, OV-210[1] | 275 | 146 | 238 | 355 | 463 | 305 | 1500 |
| 25% Cyanoethyl 75% Methyl Silicone, XE-60[1] | 250 | 204 | 381 | 340 | 493 | 367 | 1785 |
| 25% Cyanopropyl 25% Phenyl 50% Methyl Silicone, OV-225[1] | 250 | 228 | 369 | 338 | 492 | 386 | 1813 |
| Polyethylene Glycol, Carbowax 20M[1] | 225 | 322 | 536 | 368 | 572 | 510 | 2308 |
| Cyanopropyl Phenyl Silicone (50% Cyanopropyl, 50% Phenyl) | 275 | 319 | 495 | 446 | 637 | 531 | 2428 |
| 50% Cyanoethyl 50% Methyl Silicone, XF-1150[1] | 200 | 308 | 520 | 470 | 669 | 528 | 2495 |
| Ethylene Glycol Adipate[1] | 210 | 372 | 576 | 453 | 655 | 617 | 2673 |
| Ethylene Glycol Succinate[1] | 200 | 537 | 787 | 643 | 903 | 889 | 3759 |

1 = Benzene  3 = 2-Pentanone  5 = Pyridine
2 = 1-Butanol  4 = Nitropropane

[1] McReynolds, W.O., J. Chromatog. Sci. 8, 685 (1970)

It can be seen that the cyanopropyl phenyl silicone falls in the moderately high Polarity range and compares closely with XF-1150 and ethylene glycol adipate in polarity. From the upper temperature limits listed for the phases in the table, it can be seen that upper temperature limit of 275° C for the cyanopropyl phenyl silicone is unique in the moderately high and high polarity range.

EXAMPLE IV

Columns were packed with 3% OV-17 (50% phenyl, 50% methyl silicone), 10% Carbowax 20M (polyethylene glycol), 3 and 10% HI-EFF-2AP (ethylene glycol adipate), 10% HI-EFF-2BP (ethylene glycol succinate), and 3 and 10% cyanopropyl phenyl silicone (50% cyanporopyl, 50% phenyl), all on 100/120 GAS-CHROM Q as the solid support. These columns were compared for the separation of saturated, unsaturated, and polyunsaturated fatty acid methyl esters (FAMES). Based on their McReynolds Constants, OV-17 is a moderately low polarity phase, Carbowax 20M, HI-EFF-2AP, and the cyanopropyl phenyl silicone are moderately high polarity phases, and HI-EFF-2BP is a high polarity phase. In general, separation between saturated FAMES of different carbon numbers decreases with increasing polarity of the stationary phase. Separation between unsaturated and saturated FAMES of the same carbon number increases with increasing polarity of the stationary phase. The following table lists the retention times relative to methyl stearate ($C_{18}$) for methyl oleate ($C_{18}1=$), methyl linoleate ($C_{18}2=$), methyl linolenate ($C_{18}3=$), and methyl arachidate ($C_{20}$) on the various columns described above in increasing order of polarity of the stationary phases as defined in the above discussion.

|  | Temp., °C | Relative Retention Times | | | | |
|---|---|---|---|---|---|---|
|  |  | $C_{18}$ | $C_{18}1=$ | $C_{18}2=$ | $C_{18}3=$ | $C_{20}$ |
| 50% Phenyl 50% Methyl Silicone, OV-17[1] | 200 | 1.00 | — | — | 1.13 | 2.08 |
| Polyethylene Glycol Carbowax 20M[2] | 210 | 1.00 | — | — | 1.28 | 1.85 |
| Cyanopropyl Phenyl Silicone (50% Cyanopropyl, 50% Phenyl)[1] | 180 | 1.00 | 1.12 | — | 1.62 | 1.93 |
| Cyanopropyl Phenyl Silicone (50% Cyanopropyl, 50% Phenyl)[2] | 180 | 1.00 | 1.13 | 1.36 | 1.70 | 1.95 |
| Ethylene Glycol Adipate, HI-EFF-2AP[1] | 180 | 1.00 | 1.12 | — | 1.75 | 1.90 |
| Ethylene Glycol Adipate, HI-EFF-2AP[2] | 180 | 1.00 | 1.12 | 1.37 | 1.79 | 1.93 |
| Ethylene Glycol Succinate HI-EFF-2BP[2] | 180 | 1.00 | 1.21 | 1.61 | 2.24 | 1.73 |

[1]3 wt. % of liquid phase on 100/120 GAS-CHROM Q
[2]10 wt. % of liquid phase on 100/120 GAS-CHROM Q It can be seen from this table that the cyanopropyl phenyl silicone falls in the moderately high polarity range and compares closely with ethylene glycol adipate in polarity.

EXAMPLE V

A column containing a 3% cyanopropyl phenyl silicone packing was conditioned at 250° C for 16 hours and then tested with fatty acid methyl ester (FAMES). The column was then reconditioned for another 16 hours at 250° C and retested. The results of this test are shown in the following table.

| 3 wt. % Cyanopropyl Phenyl Silicone (50% cyanopropyl, 50% phenyl) on 100/120 GAS-CHROM Q | | | | | | | | |
|---|---|---|---|---|---|---|---|---|
| Column Conditioning History | | | k' for C | Relative Retention Times at 180° C | | | | |
| No. | Temp., °C | Time, Hr. | at 170° C | $C_{18}$ | $C_{18}1=$ | $C_{18}2=$ | $C_{18}3=$ | $C_{20}$ |
| 1 | 250 | 16 | 33.38 | 1.00 | 1.12 | — | 1.64 | 1.95 |
| 1 | 250 | 32 | 36.02 | 1.00 | 1.12 | — | 1.64 | 1.99 |

The small variations in the k' values and the relative retention times are within experimental error and exhibit no trend with the high temperature reconditioning periods. If serious phase loss occurred during reconditioning, significant decreases in the k' values and significant changes in the relative retention times would occur. Another factor that occurs from serious phase loss is peak tailing. No peak tailing occurred.

EXAMPLE VI

Figure 2:
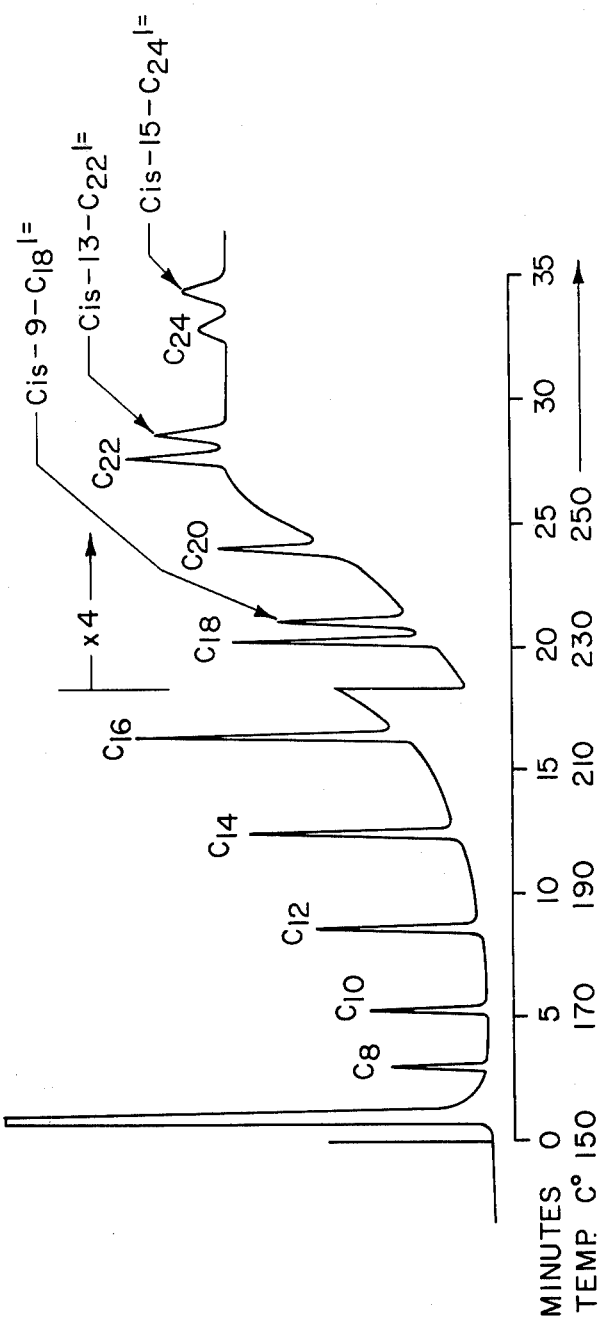
FIG. 2 is a gas chromatogram referred to in EXAMPLE VI of
Fatty Acid Methyl Esters Temperature Programmed at 4° C/min.
on
10% Ethylene Glycol Adipate (HI-EFF-2AP)
on 100/120 GAS-CHROM Q in 6' × 4mm I.D. glass column. Flame ionization detector at 1 × 10⁻⁹ AFS N₂ flow rate = 4ml/min.

Two columns, one containing 10 wt. % of the cyanopropyl phenyl silicone and the other containing 10 wt. % ethylene glycol adipate (HI-EFF-2AP) both on 100/120 GAS-CHROM Q were temperature programmed from 150° to 150° C at 4° C/min. and their baseline rise was recorded. The two columns were run in a dual column gas chromatograph with flame ionization detectors. The baseline rise for each column with temperature in shown in the following table and in FIGS. 1 and 2.

|  | Baseline Rise, $10^{-9}$ Amp. | |
|---|---|---|
| Temp., °C | Cyanopropyl Phenyl Silicone | Ethylene Glycol Adipate (HI-EFF-2AP) |
| 150 | 0 | 0 |
| 170 | 0 | 0.010 |
| 190 | 0 | 0.041 |
| 210 | 0.032 | 0.12 |
| 230 | 0.11 | 0.42 |
| 250 | 0.27 | 1.75 |

It can be seen that at an electrometer setting of 1 × $10^{-9}$ amp. full scale, the baseline for the ethylene glycol succinate rises well off the recorded scale by 250° C, while the baseline for the cyanopropyl phenyl silicone rises only 27% of the scale at 250° C. The spearation of the saturated and mono-unsaturated $C_{22}$ and $C_{24}$ methyl esters at 250° shown in FIG. 1 demonstrates the high degree of polarity of the cyanopropyl phenyl silicone at high temperature and the relatively small baseline rise to 250° C demonstrates its stability at high temperatures.

EXAMPLE VII

Figure 3:
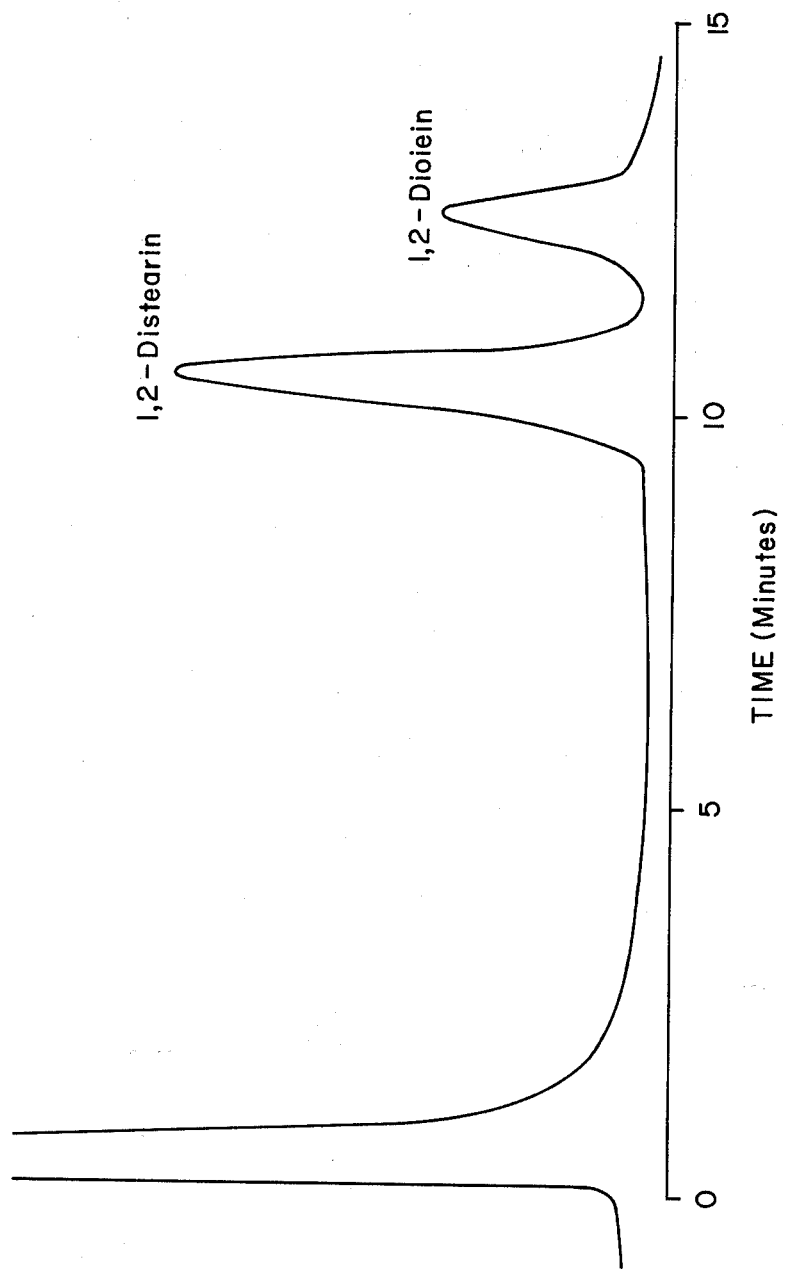
FIG. 3 is a gas chromatogram referred to in EXAMPLE VII of
TMS Diglycerides on
3% Cyanopropyl Phenyl Silicone
(50% Cyanpropyl, 50% Phenyl)
on 100/120 GAS-CHROM Q in 6' × 2mm I.D. glass column.
Column Temp: 270° C
Flame ionization detector
N₂ flow rate: 35ml/min.

A 6 ft. × 2mm I.D. glass column was packed with 3wt. % of the cyanopropyl phenyl silicone and was successfully used to separate the trimethylsilyl ethers of the diglycerides, 1,2-distearin and 1,2 diolein at 270° C. Complete separation of these two compounds was obtained, with the unsaturated diolein eluting after the saturated distearin. The chromatogram is shown in FIG. 3. This separation demonstrates the high degree of polarity of the cyanopropyl phenyl silicone at 270° C.

We claim:

1. A column for conducting gas-liquid chromatographic separations, said column exhibiting moderately high polarity in the temperature range of 20° to 275° C and filled with a packing containing a liquid phase having recurring units of the following formula:

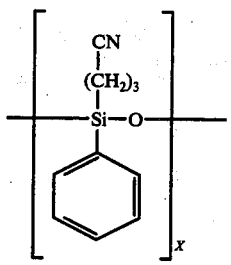

Where X is a whole number greater than 2.

2. A column for conducting gas-liquid chromatographic separations, said column exhibiting moderately high polarity in the temperature range of 20° to 275° C and having its inner wall surface covered with a film of a liquid phase consisting of recurring units of the following formula:

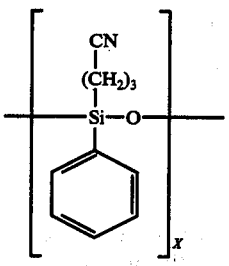

Where X is a whole number greater than 2.

3. A column for conducting gas-liquid chromatographic separations, said column exhibiting moderately high polarity in the temperature range of 20° to 275° C and having its inner wall surface covered with a film of packing, said packing containing a liquid phase having recurring units of the following formula:

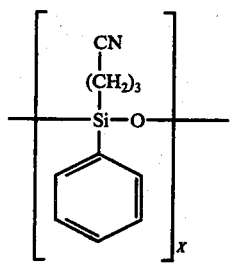

Where X is a whole number greater than 2.

4. In the gas-liquid chromatographic separations of chemical compounds, the method which comprises of passing a mixture of chemical compounds and a carrier gas over an elongated film of a liquid stationary phase which exhibits moderately high polarity and which is maintained in the temperature range of 20° to 275° C and which consists of recurring units of the following formula:

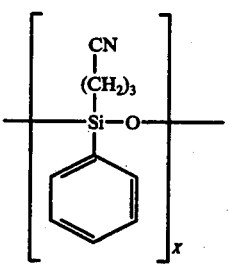

Where X is a whole number greater than 2.

* * * * *